United States Patent Office 3,161,631
Patented Dec. 15, 1964

3,161,631
BENZOTHIAZOLE AZO COMPOUNDS CONTAIN-
ING A DICARBOXIMIDO RADICAL
James M. Straley and David J. Wallace, Kingsport, Tenn.,
assignors to Eastman Kodak Company, Rochester, N.Y.,
a corporation of New Jersey
No Drawing. Filed Oct. 22, 1962, Ser. No. 232,239
8 Claims. (Cl. 260—158)

This invention relates to novel compounds containing a dicarboximido radical, and more particularly to azo compounds, such as azo dyestuffs, containing a dicarboximido radical. Particular azo compounds containing this radical include compounds obtained by coupling diazotized 2-amino benzothiazoles with dicarboximidoalkyl aniline coupling components such as N-[2(N-ethyl-m-toluidine)ethyl]phthalimide.

These particular azo compounds have the general formula

I $$R—N=N—R_1—\overset{R_2}{\underset{|}{N}}—R_3—Z$$

wherein
R = a 2-benzothiazolyl radical, i.e.,

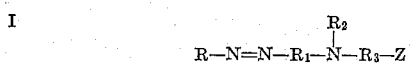

in which Ar is an ortho-phenylene radical, such as present in 2-aminobenzothiazole and the substituted 2-aminobenzothiazoles described in the table below, the alklsulfonyl, nitro, cyano and cyanoalkylsulfonyl substituted 2-aminobenzothiazoles being particularly efficacious for use in preparing the azo compounds;

$R_1$ = a monocyclic aromatic radical of the benzene series derived from an aminoalkylaniline coupling component and including phenylene, —m—$CH_3C_6H_3$—, i.e.,

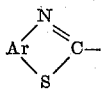

—o-$ClC_6H_3$—, —m-$ClC_6H_3$—, —2,5-di-$(OCH_3)C_6H_2$—, —2,5-di-$ClC_6H_2$—, —o-$OCH_3C_6H_3$— etc;

$R_2$ = a hydrogen atom or lower alkyl group such as straight and branch-chained lower alkyl groups including substituted lower alkyl groups, e.g., methyl, ethyl, propyl, iso-propyl, butyl, iso-butyl; hydroxyalkyl, e.g., hydroxyethyl; cyanoalkyl, e.g., cyanoethyl; alkoxyalkyl, e.g., methoxyethyl; aryloxyalkyl, e.g., phenoxyethyl; acyloxalkyl and haloalkyl;

$R_3$ = an alkylene radical straight or branch-chained, particularly lower alkylene, such as —$(CH_2)_n$— wherein n is a positive integer from 1 to 4, Z = a dicarboximido radical such as phthalimido, succinimido, maleimido, citraconimido, etc, as indicated in the table below, derived from the corresponding anhydride.

The 2-aminobenzothiazoles which are diazotized and coupled with the mentioned coupling components are, for example, 2-aminobenzothiazole, 2-amino-6-methylsulfonylbenzothiazole and other 2-aminobenzothiazoles disclosed in the examples and table hereinafter.

The dicarboximidoalkyl aniline coupling components of the invention which are coupled with the diazotized 2-aminobenzothiazoles, have the following general formula

II $$H—R_1—\overset{R_2}{\underset{|}{N}}—R_3—Z$$

wherein $R_1$, $R_2$, $R_3$ and Z have the same meaning as given above and $R_1$ is not substituted in the diazo coupling position.

The dicarboximido radical Z of the azo compounds and coupling components of Formulas I and II above, has the following general formula

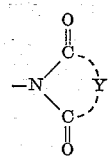

wherein
Y represents the atoms necessary to complete a ring containing 4 or 5 carbon atoms in addition to the nitrogen atoms, i.e., the hydrocarbon residue of the dicarboxylic acid anhydride from which the radical is derived, including substtiuted and unsubstituted alkylene, vinylene and ortho-phenylene groups such as —$CH_2CH_2$— in the succinimido radical

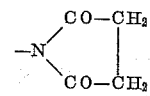

The dicarboximidoalkyl aniline coupling components are obtained as described in the following typical reaction by the condensation of a dicarboxylic acid anhydride with aminoalkylanilines.

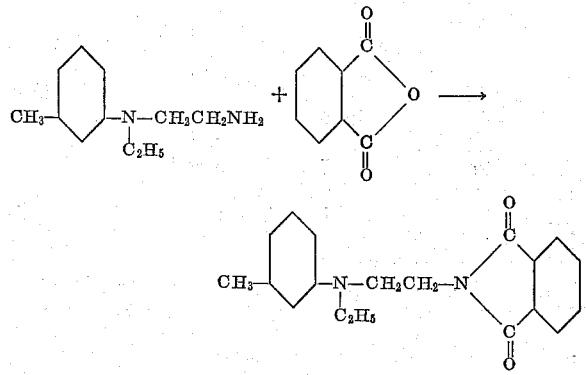

Representative 5- and 6-membered cyclic dicarboximidoalkyl aniline couplers referred to in the table and examples below useful for preparing the azo compounds are N-[2(N-ethyl-m-toluidine)ethyl]phthalimide
N-[2(N-ethylanilino)ethyl]succinimide
N-[2(N-ethyl-m-toluidine)ethyl]tetrachlorophthalimide
N-[2-(N-butyl-m-toluidine)ethyl]succinimide
N-[2(N-ethyl-m-toluidine)ethyl]bicyclo[2.2.1]-5-heptene-2,3-dicarboximide
N-[2(N-ethylanilino)propyl]succinimide
N-[2(N-ethyl-m-toluidine)ethyl]cyclohexane-1,2-dicarboximide
N-[2(N-ethyl-m-toluidine)ethyl]citraconimide
N-β-glutarimidoethyl-N-ethyl-m-toluidine
N-ethyl-N-succinimidomethylaniline
Nα-chloro-β-hydroxypropyl-N-β-succinimidoethyl-m-toluidine
N-β-acetoxyethyl-N-β-succinimidoethyl-m-toluidine
N-ethyl-N-phthalimidomethyl-m-toluidine The azo compounds can be used for dyeing textile materials including synthetic polymer filbers, yarns and fabrics giving fast orange to violet shades when applied by conventional dyeing methods to polyester fibers. The azo compounds have moderate affinity for cellulose ester and polyamide fibers and possess the valuable property of staining wool less than do previous benzothiazole dyes. When the azo compounds are used for dyeing such hydrophobic materials, they should be free of water-solubilizing groups. In general the dyes have good fastness, for example, to light, washing, gas (atmospheric fumes) and sublimation. The dyes are useful in application and discharge printing.

The following examples will serve to illustrate the preparation of representative intermediates and azo compounds of our invention.

EXAMPLE 1

(A) 89 g. (0.5 m.) of N-β-aminoethyl-N-ethyl-m-toluidine and 74 g. (0.5 m.) of phthalic anhydride were mixed intimately and heated gradually until an exothermic reaction began. The temperature rose to 120° C. without further heating. After the temperature began to fall heat was applied and held at 130–140° C. for 1 hour. The patrially cooled melt was drowned in 500 cc. of hot ethyl alcohol and allowed to cool. The product was filtered off, washed with a little alcohol and dried at 60° C. The yield was 129 g. of material melting at 86–87° C. According to analysis this product, N-[2(N-ethyl-m-toluidine)ethyl]phthalimide, has the structure

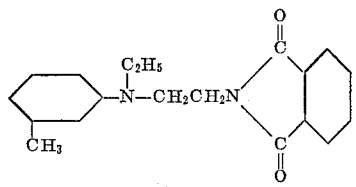

(B) A coupler N-[2(N-ethyl-m-toluidine)ethyl]succinimide was prepared as in A except that the anhydride used was 50 g. (0.5 m.) of succinic anhydride and after the heating period the mix was drowned in 1 liter of water. Yield=99 g., melting at 81.5–82.5° C.

(C) 44.5 g. of the amine used in A and B, and 71.5 g. (0.25 m.) of tetrachlorophthalic anhydride were heated at 140–150° C. for about an hour, allowing the water formed to distill off. The mixture solidified, and after cooling, was pulverized and then recrystallized from 750 cc. of dimethyl formamide. The yellow solid was collected by filtration, washed with water, and dried at 100° C. The product melted at 194–6° C. and analysis showed it to be the tetrachloro derivative of the product of A, N-[2(N-ethyl-m-toluidine)ethyl]tetrachlorophthalimide.

(D) 4-Carboxyphthalic anhydride was used as in A in place of phthalic anhydride to obtain the imide N-[2(N-ethyl-m-toluidine)ethyl]-4-carboxyphthalimide M.P. 160–162° C.

(E) 1,2,3,6-Tetrahydrophthalic anhydride was used as in A to produce the imide N-[2(N-ethyl-m-toluidine)ethyl]-1,2,3,6-tetrahydrophthalimide M.P. 76–77.5° C.

(F) 3-Nitrophthalic anhydride was used as in A to produce the imide N-β-3-nitrophthalimidoethyl-N-ethyl-m-toluidine M.P. 124–125° C.

(G) The compound of F was reduced using $H_2$ and Raney nickel in alcohol to yield the aminophthalic acid imide N-β-3-aminophthalimidoethyl-N-ethyl-m-toluidine M.P. 116–117° C.

(H) 32.8 g. (0.2 m.) bicyclo[2.2.1]-5-heptene-2,3-dicarboxylic acid anhydride and 35.6 g. (0.2 m.) N-β-aminoethyl-N-ethyl-m-toluidine were heated together at 130–140° C. for 1 hour. The melt was poured into 200 cc. hot ethanol and allowed to cool over night. The solid was filtered off, washed with ethanol and dried in air. The product N-[2-(N-ethyl-m-toluidine)ethyl]bicyclo[2.2.1]-5-heptene-2,3-dicarboximide melted at 72–73.5° C.

(J) When the product of H is heated at 250–75° C. for 10 min. cyclopentadiene is evolved forming N-β-maleimidoethyl-N-ethyl-m-toluidine.

(K) 77 g. (0.5 m.) cyclohexane-1,2-dicarboxylic anhydride was added portionwise to 89 g. (0.5 m.) of N-β-amino-ethyl-N-ethyl-m-toluidine, the temperature rising spontaneously to 125° C. during addition, after which the mix was heated 2 hours at 130–140° C. The viscous product N-[2-(N-ethyl-m-toluidine)ethyl]cyclohexane-1,2-dicarboximide was distilled collecting the fraction. B. 183–4° C./.59 mm. $N_D^{20}$=1.5559.

(L) 32.8 g. (0.2 m.) N-β-aminoethyl-N-ethyl-aniline and 20 g. succinic anhydride heated with 0.1 g. sulfanilic acid gave the β-succinimido derivative, M. 70–72° C.

(M) N-β-aminoethyl-o-toluidine and succinic anhydride gave upon heating the corresponding imido compound, M. 131–2° C.

(N) 17.8 g. N-β-aminoethyl-N-ethyl-m-toluidine was added dropwise to 11.2 g. citraconic anhydride. The mix was solid after addition was complete. The mix was heated 1 hour at 140–50° C. and distilled at 146–50° C./2.5 mm.

(O) N-β-aminoethyl-m-toluidine and succinic anhydride upon heating gave the imido derivative melting at 162–5° C.

(P) The product of O was treated with ethylene oxide in ethanol to give N-2-hydroxyethyl-N-2-succinimidoethyl-m-toluidine, M. 110–111° C.

(Q) 89.0 g. (0.5 m.) N-β-aminoethyl-N-ethyl-m-toluidine, 57.0 g. (0.5 m.) of glutaric anhydride and 1 g. of sulfanilic acid were heated at 150–160° C. for 1.5 hours. Distillation in vacuo gave 79.6 g. of N-β-glutarimidoethyl-N-ethyl-m-toluidine, B. 168–71° C./0.5 mm.

(R) 23.1 g. (0.1 m.) N-β-succinimidoethyl-m-toluidine, 4.1 g. cupric acetate monohydrate, 0.1 g. hydroquine, and 58.3 g. (1.1 m.) acrylonitrile were heated at 80° C. for 24 hours and filtered hot. Upon cooling the product crystallized out, was filtered off and recrystallized twice from ethanol, giving N-β-cyanoethyl-N-β-succinimidoethyl-m-toluidine, M. 121–4° C. The starting material was prepared by condensing succinic anhydride with N-β-aminoethyl-m-toluidine at 150–60° C. and pouring into ethanol.

(S) 19.8 g. of succinimide was stirred with 300 cc. of alcohol. After adding 19.6 cc. of 37% formaldehyde the mix was heated to reflux and 27.8 g. of N-ethylaniline added. After 1 hour's additional reflux the alcohol was distilled off and unchanged succinimide removed from the residue by extraction with 200 cc. of 5% NaOH. The product N-ethyl-N-succinimidomethylaniline was washed with water and distilled, collecting the fraction boiling at 152–4° C./0.45 mm.

(T) 9.8 g. of 37% formaldehyde was stirred into 14.7 g. phthalimide in 172 cc. of alcohol. The mix was brought to reflux and 15.3 g. N-ethyl-m-toluidine was added. After 30 min. further reflux the solution was chilled and the product isolated by filtration. After recrystallization from alcohol the product N-ethyl-N-phthalimidomethyl-m-toluidine melted at 80–82° C.

(U) The product of P was treated with acetic anhydride in acetic acid, drowned in water, filtered and air-dried to yield N-β-acetoxyethyl-N-β-succinimidoethyl-m-toluidine.

(V) The product of O was treated in benzene with epichlorohydrin and the solvent removed by distillation to yield N - α - chloro - β - hydroxypropyl - N-β-succinimidoethyl-m-toluidine.

EXAMPLE 2

Preparation of Dyes 6.84 g. (0.03 m.) of 2-amino-6-methylsulfonylbenzothiazole were suspended in 72 cc. of water and 42.8 cc. of 96% $H_2SO_4$ were added. The temperature rose and the amine dissolved completely. The solution was cooled to −5° C. and a solution of 2.52 g. $NaNO_2$ in 15.1 cc. of 96% $H_2SO_4$ was added in 20 min, keeping the temperature below 0° C. After 1.75 hours stirring below 0° C. a clear brown solution was obtained. This was run into a solution of 9.2 (0.03 m.) of the product of Example 1A in 250 cc. of 15% $H_2SO_4$ below 10° C. Dye precipitation began at once and the mix was diluted with 1 liter of water and the solid isolated by filtration, washing with water and drying at 60° C. The dye so obtained imparts fast bluish red shades to polyester fibers.

The dye has the following formula

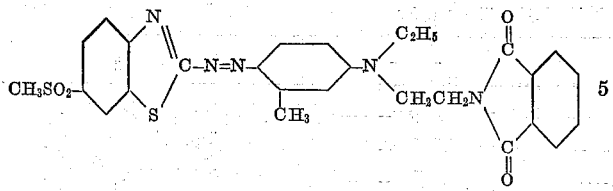

EXAMPLE 3

Example 2 was repeated using 4.5 g. of 2-aminobenzothiazole and 7.8 g. of the coupler of Example 1B. The product imparts red shades to polyesters and somewhat bluer shades to cellulose acetate.

EXAMPLE 4

Example 2 was repeated using 6.2 g. of 2-amino-6-thiocyanobenzothiazole and 9.7 g. of the imide of Example 1G. The dye imparts pink shades to polyester fibers.

EXAMPLE 5

Example 2 was repeated using 8.9 g. of N-ethyl-N-$\beta$-phthalimidoethylaniline. The product dyes polyesters in bright fast shades slightly yellower than does the product of Example 2.

EXAMPLE 6

Example 2 was repeated using the diazo from 5.25 g. of 2-amino-6-cyanobenzothiazole. The dye obtained imparts fast red shades to polyester fibers.

EXAMPLE 7

Example 2 was repeated using the diazo derived from 8.52 g. of 2-amino-6-$\beta$-cyanoethylsulfonylbenzothiazole and the coupler was 7.35 g. of N-ethyl-N-$\beta$-succinimidoethylaniline. The product dyes polyester fibers in shades somewhat less blue than does the product of Example 2.

EXAMPLE 8

Example 7 was repeated using the diazo derived from 5.85 g. of 2-amino-6-nitrobenzothiazole. The product dyes polyesters in fast bluish-red shades.

EXAMPLE 9

Example 6 was repeated except the coupler used was 7.8 g. of N-ethyl-N-$\beta$-succinimidoethyl-m-toluidine. The product imparts fast red shades to polyester fibers.

EXAMPLE 10

Example 2 was repeated using as the coupler 7.77 g. of N-ethyl-N-$\beta$-glutarimidoethyl-m-toluidine. The product imparts fast red shades to polyester fibers.

EXAMPLE 11

2.28 g. of 2-amino-6-methylsulfonylbenzothiazole was suspended in 24 cc. of water and 26.2 g. conc. $H_2SO_4$ added with stirring. The solution was cooled to $-5°$ C. and 0.84 g. $NaNO_2$ in 9.3 g. conc. $H_2SO_4$ added below 0° C. After 2 hrs. the diazo solution was stirred into a solution of 2.32 g. of N-ethyl-N-succinimidomethylaniline in 25 cc. of 15% sulfuric acid in an ice-bath. After two hours in the ice-bath the mix was drowned in water, filtered, and the solid washed well with water and air-dried. The product 4 - (6' - methylsulfonylbenzothiazole - 2' - azo) - N-ethyl-N-succinimidomethylaniline dyes cellulose acetate and polyesters in bright scarlet shades.

The dyes described in the following table are prepared in the manner of the above examples using the indicated diazotized 2-aminobenzothiazoles and dicarboximidoalkyl aniline couplers wherein $R_1$, $R_2$, $R_3$ and Z refer to the general formulas above. For example, the first dye described in the table is made by diazotizing 2-amino-6-methylsulfonylbenzothiazole and coupling the product as described in Example 2 with N - [2(N - methoxyethylaniline)ethyl] phthalimide

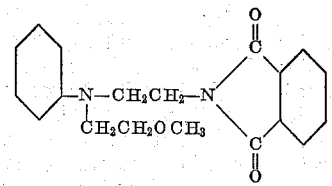

to obtain a dye having the formula

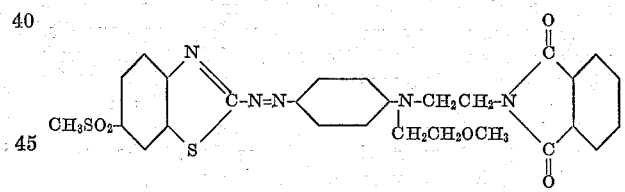

| 2-Aminobenzothiazole Diazotized | Dicarboximidoalkyl aniline coupler | | | | Color of Polyester Dyeings |
|---|---|---|---|---|---|
| | $R_1$ | $R_2$ | —$R_3$— | Z | |
| 6-methylsulfonyl | —$C_6H_4$— | $CH_3OCH_2CH_2$— | —$CH_2CH_2$— | Phthalimido | Pink. |
| Do | —m—$CH_3C_6H_3$— | $C_4H_9$— | —$CH_2CH_2$— | do | Do. |
| Do | —$C_6H_4$— | $C_2H_5$— | —$CH_2CH_2CH_2$— | do | Do. |
| Do | —o—$CH_3C_6H_3$— | $C_2H_5$— | —$CH_2CH_2$— | do | Do. |
| Do | —m—$ClC_6H_3$— | $C_3H_7$— | —$CH_2CH_2$— | do | Do. |
| Do | 2,5-di-$OCH_3C_6H_2$— | $C_2H_5$— | —$CH_2CH_2$— | do | Do. |
| Do | —$C_6H_4$— | $C_2H_5$— | —$CH_2CH_2$— | Succinimido | Do. |
| Do | —m—$CH_3C_6H_3$— | $C_2H_5$— | —$CH_2CH_2CH_2$— | do | Do. |
| Do | —m—$CH_3C_6H_3$— | $C_4H_9$— | —$CH_2CH_2$— | do | Do. |
| Do | —m—$CH_3C_6H_3$— | $C_2H_5$— | —$CH_2CH_2$— | Maleimido | Do. |
| Do | —m—$CH_3C_6H_3$— | $C_2H_5$— | —$CH_2CH_2$— | Nitrophthalimido | Do. |
| 5-methoxy | —m—$CH_3C_6H_3$— | $C_2H_5$— | —$CH_2CH_2$— | Phthalimido | Red-orange. |
| 4,7-diethoxy | —m—$CH_3C_6H_3$— | $C_2H_5$— | —$CH_2CH_2$— | do | Do. |
| 6-nitro | —m—$CH_3C_6H_3$— | $C_2H_5$— | —$CH_2CH_2$— | Succinimido | Bordeaux. |
| 6-$\beta$-cyanoethylthio | —m—$CH_3C_6H_3$— | $C_2H_5$— | —$CH_2CH_2$— | do | Red. |
| 6-cyano | —m—$CH_3C_6H_3$— | $C_2H_5$— | —$CH_2CH_2$— | do | Do. |
| 6-bromo | —m—$CH_3C_6H_3$— | $C_2H_5$— | —$CH_2CH_2$— | do | Do. |
| 6-$\beta$-hydroxyethylsulfonyl | —m—$CH_3C_6H_3$— | $C_2H_5$— | —$CH_2CH_2$— | do | Pink. |
| 6-sulfamyl | —m—$CH_3C_6H_3$— | $C_2H_5$— | —$CH_2CH_2$— | do | Do. |
| 6-ethylsulfonyl | —m—$CH_3C_6H_3$— | $C_2H_5$— | —$CH_2CH_2$— | do | Do. |
| 6-butylsulfonyl | —m—$CH_3C_6H_3$— | $C_2H_5$— | —$CH_2CH_2$— | do | Do. |
| 6-cyanomethylsulfonyl | —m—$CH_3C_6H_3$— | $C_2H_5$— | —$CH_2CH_2$— | do | Do. |
| 4,6-dichloro | —m—$CH_3C_6H_3$— | $C_2H_5$— | —$CH_2CH_2$— | do | Red. |
| 6-methyl | —m—$CH_3C_6H_3$— | $C_2H_5$— | —$CH_2CH_2$— | do | Do. |
| 6-methylthio | —m—$CH_3C_6H_3$— | $C_2H_5$— | —$CH_2CH_2$— | do | Do. |
| 6-cyano | —m—$CH_3C_6H_3$— | $C_2H_5$— | —$CH_2CH_2$— | Phthalimido | Pink. |
| 6-$\beta$-cyanoethylsulfonyl | —$C_6H_4$— | $C_2H_5$— | —$CH_2CH_2$— | Succinimido | Red. |
| 6-thiocyano | —m—$CH_3C_6H_3$— | $C_2H_5$— | —$CH_2CH_2$— | do | Pink. |
| Unsubstituted | —m—$CH_3C_6H_3$— | $C_2H_5$— | —$CH_2CH_2$— | do | Scarlet. |
| 6-nitro | —$C_6H_4$— | $C_2H_5$— | —$CH_2CH_2$— | do | Red. |
| 6-acetamido | —m—$CH_3C_6H_3$— | $C_2H_5$— | —$CH_2CH_2$— | do | Pink. |
| 6-$NH_2O_2S$— | —m—$CH_3C_6H_3$— | $C_2H_5$— | —$CH_2CH_2$— | do | Do. |
| 6-$(CH_3)HNO_2S$— | —m—$CH_3C_6H_3$— | $C_2H_5$— | —$CH_2CH_2$— | do | Do. |
| 6-$(C_2H_5)_2NO_2S$— | —m—$CH_3C_6H_3$— | $C_2H_5$— | —$CH_2CH_2$— | do | Do. |
| 6-methylsulfonyl-4-nitro | —m—$CH_3C_6H_3$— | $C_2H_5$— | —$CH_2CH_2$— | do | Violet. |

| 2-Aminobenzothiazole Diazotized | Dicarboximidoalkyl aniline coupler | | | | Color of Polyester Dyeings |
|---|---|---|---|---|---|
| | R₁ | R₂ | —R₃— | Z | |
| 6-methylsulfonyl | —m—CH₃C₆H₃— | C₂H₅— | —CH₂CH₂— | Bicyclo[2,2,1]-5-heptene-2,3-dicarboximido. | Pink. |
| Do | —m—CH₃C₆H₃— | C₂H₅— | —CH₂CH₂— | Tetrachlorophthalimido. | Do. |
| Do | —m—CH₃C₆H₃— | C₂H₅— | —CH₂CH₂— | Hexahydrophthalimido | Do. |
| Do | —m—CH₃C₆H₃— | C₂H₅— | —CH₂CH₂— | 4-carboxyphthalimido | Do. |
| Do | —m—CH₃C₆H₃— | C₂H₅— | —CH₂CH₂— | Citraconimido | Do. |
| Do | —o—CH₃C₆H₃— | H | —CH₂CH₂— | Succinimido | Orange. |
| Do | —m—CH₃C₆H₃— | —C₂H₄CN | —CH₂CH₂— | do | Scarlet. |
| Do | —m—CH₃C₆H₃— | —C₂H₄OH | —CH₂CH₂— | do | Red. |
| Do | —m—CH₃C₆H₃— | —CH₃ | —CH₂CH₂— | do | Do. |
| Do | —m—CH₃C₆H₃— | —CH₂CH₂OOCCH₃ | —CH₂CH₂— | do | Do. |
| Do | —m—CH₃C₆H₃— | —CH₂CHCH₂Cl<br>\|<br>OH | —CH₂CH₂— | do | Do. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetate-butyrate.

Polymeric linear polyester materials of the terephthalate type are illustrated of the liner aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Azo compounds having the general formula $$R-N=N-R_1-\underset{\underset{R_2}{|}}{N}-R_3-Z$$

wherein

R = a 2-benzothiazolyl radical,
R₁ = a monocyclic aromatic radical,
R₂ = a member of the class consisting of hydrogen, alkyl, hydroxyalkyl, phenoxyalkyl, acyloxyalkyl, haloalkyl and cyanoalkyl, the alkyl groups of which are lower alkyl,
R₃ = lower alkylene and
Z = a dicarboximido radical, said compounds being free of water-solubilizing groups.

2. Azo compounds having the formula $$R-N=N-R_1-\underset{\underset{R_2}{|}}{N}-R_3-Z$$

wherein

R = a 2-benzothiazolyl radical,
R₁ = a monocyclic aromatic radical,
R₂ = lower alkyl,
R₃ = —CH₂CH₂— and
Z = a succinimido radical, said compounds being free of water-solubilizing groups.

3. Azo compounds having the formula $$R-N=N-R_1-\underset{\underset{R_2}{|}}{N}-R_3-Z$$

wherein

R = a 2-benzothiazolyl radical,
R₁ = a monocyclic aromatic radical,
R₂ = lower alkyl,
R₃ = —CH₂CH₂— and
Z = a phthalimido radical, said compounds being free of water-solubilizing groups.

4. An azo compound having the formula

[Structural formula: CH₃SO₂-benzothiazolyl—C—N=N—phenyl(CH₃)—N(C₂H₅)—CH₂CH₂N-phthalimido]

5. An azo compound having the formula

[Structural formula: NC-benzothiazolyl—C—N=N—phenyl(CH₃)—N(C₂H₅)—CH₂CH₂N-phthalimido]

6. An azo compound having the formula
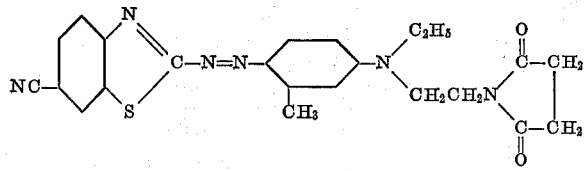
7. An azo compound having the formula
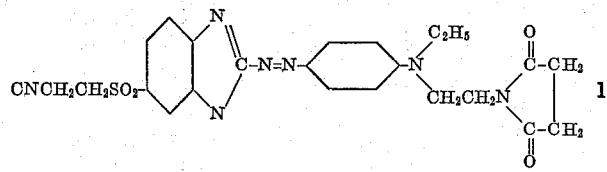
8. An azo compound having the formula
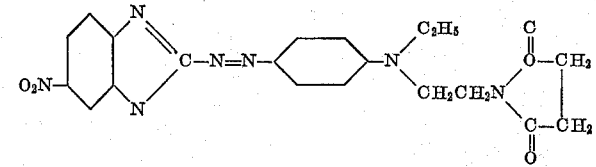
References Cited in the file of this patent
UNITED STATES PATENTS
| | | |
|---|---|---|
| 2,771,466 | Towne et al. | Nov. 20, 1956 |
| 2,852,504 | Towne et al. | Sept. 16, 1958 |
| 3,037,993 | Shulgin | June 5, 1962 |
| 3,043,647 | Kopp et al. | July 10, 1962 |
| 3,060,191 | Kolb et al. | Oct. 23, 1962 |
| 3,068,056 | Coe | Dec. 11, 1962 |

UNITED STATES PATENT OFFICE
CERTIFICATE OF CORRECTION

Patent No. 3,161,631                                December 15, 1964

James M. Straley et al.

It is hereby certified that error appears in the above numbered patent requiring correction and that the said Letters Patent should read as corrected below.

Column 1, lines 31 and 32, for "alklsulfonyl" read -- alkylsulfonyl --; column 4, line 26, for "hydroquine" read -- hydroquinone --; column 9, lines 12 to 18, for that portion of the formula reading:

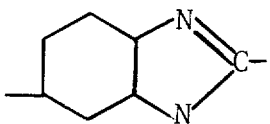      read      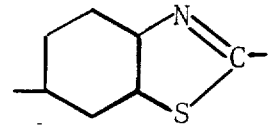

column 10, lines 2 to 7, the formula should appear as shown below instead of as in the patent:

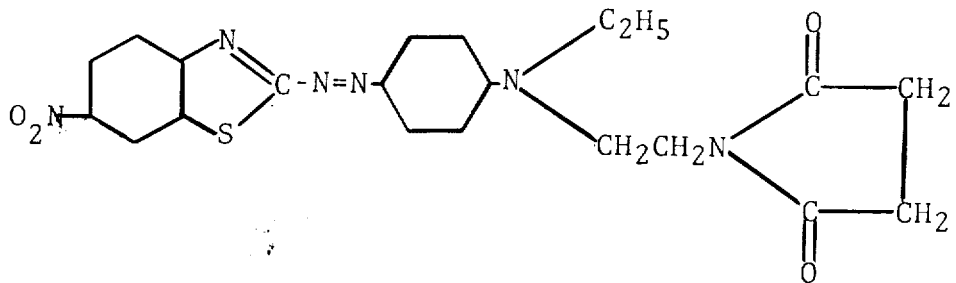

Signed and sealed this 24th day of August 1965.

(SEAL)
Attest:

ERNEST W. SWIDER
Attesting Officer

EDWARD J. BRENNER
Commissioner of Patents